United States Patent Office 3,489,698
Patented Jan. 13, 1970

3,489,698
STABLE EMULSIONS OF INCOMPATIBLE POLYOLS CONTAINING ETHYLENE OXIDE-PROPYLENE OXIDE BLOCK COPOLYMERS AS EMULSIFIERS
Edward L. Morehouse, New City, N.Y., assignor to Union Carbide Corporation, a corporation of New York
No Drawing. Filed May 3, 1967, Ser. No. 637,045
Int. Cl. C08g 22/14
U.S. Cl. 260—9    5 Claims

ABSTRACT OF THE DISCLOSURE

Stable emulsions of at least two normally incompatible polyols are produced. The emulsion contains at least one low molecular weight polyol having a hydroxyl number of from about 420 to about 650, at least one high molecular weight polyol having a hydroxy number of from about 34 to about 56 and certain specific emulsifiers; the ratio of hydroxyl numbers of the polyols in the mixture is at least 10:1. The emulsions can be used to produce urethane polymers.

---

This invention relates to stable emulsions of at least two normally incompatible polyols.

It has recently been found by others that urethane polymers that show nearly constant load-bearing properties over a wide temperature range can be produced by using a mixture of incompatible polyols. The urethane polymers so produced are not a part of this invention and are produced by reacting on organic polyisocyanate with a mixture of two or more polyols which does not form a homogeneous mixture. The incompatible polyols mixtures contain at least one low molecular weight polyol having a high hydroxyl number and at least one high molecular weight polyol having a low hydroxyl number. A problem in the use of such mixtures, however, is to prevent separation of the components thereof, due to their incompatibility, to such an extent that the composition of the mixture as it is introduced into the reaction zone fluctuates to too great an extent.

It has now been found that the incompatible polyols mixtures can be emulsified with certain critically defined emulsifiers thereby eliminating the fluctuation in composition of the polyols mixture as it is reacted with the isocyanate.

In order to produce urethane polymers that possess the desired load-bearing or stiffness-temperature relationship over a wide range of temperatures it had been found that two different and incompatible polyols were needed. These produced a urethane foam that had stiffness properties that were relatively independent of temperature changes. These foams, consequently, when used in automobile safety padding applications, would not be too soft at the warmer summertime temperatures and too rigid at the colder wintertime temperatures.

The emulsifiers found most suitable are the block copolymers of ethylene oxide and propylene oxide having molecular weights of from about 4,000 to about 25,000, preferably from about 6,000 to about 15,000, in which the ethylene oxide content is from about 30 to 90 weight percent, preferably from about 50 to about 80 percent.

These emulsifiers can be produced by forming a base polymer of propylene oxide by the conventional means. This base polymer, which is dihydric is then reacted with ethylene oxide to produce a block copolymer. Other procedures are also known in the art for producing ethylene oxide/propylene oxide block copolymers. In addition the base polymer can be produced by reacting propylene oxide with a functional starter which can contain from up to four reactive sites and this base polymer is then reacted with ethylene oxide to produce the block copolymer. As suitable functional starters one can mention butanol, ethylene glycol, propylene glycol, butylene glycol, ethylene diamine, propylene diamine, gycerol, trimethylol propane, and the like.

Illustrative of block copolymers that are useful as emulsifiers in this invention are the 80/20 ethylene oxide/propylene oxide block copolymer having a molecular weight of about 6,000, about 8,700, about 11,000, or about 16,000; the 50/50 ethylene oxide/propylene oxide block copolymer having a molecular weight of about 4,500; the ethylene diamine started ethylene oxide/propylene oxide block copolymers wherein the oxide ratios are 80/20 or 70/30 and the molecular weights are about 5,500, about 8,500, about 15,000, or about 27,000; the glycerol started ethylene oxide/propylene oxide block copolymers wherein the oxide ratios are 75/25 or 90/10 and the molecular weights are about 5,000, or about 9,000; and the like. The terminal hydroxyl groups on the emulsifiers can be blocked with, for example, acetyl, propionyl, or any other acyl group. They can also be blocked with an alkyl group, such as methyl, butyl, hexyl, and the like. Methods are known to those skilled in the art and include the Williamson synthesis. Methyl isocyanate can also be used to block or cap the hydroxyl groups of the emulsifiers.

The emulsifiers can be used alone or in combinations of two or more.

The concentration of the emulsifier in the polyols mixture can vary from about 0.25 to about 5 percent by weight, preferably from about 0.5 to about 2 percent by weight based on the total weight of the emulsion. The concentration will vary depending upon the particular polyols to be emulsified. It has been observed, in some instances, that increasing the emulsifier content causes an increase in the viscosity of the emulsion.

The emulsions are readily produced by adding the liquid or molten emulsifier to the mixture of polyols while stirring at moderate shear rates. The mixing is preferably carried out at about room temperature, though temperatures somewhat lower or higher than room temperature can be employed. Any suitable temperature can be employed provided that the increase in temperature does not result in a substantial increase in compatibility or solubility of the polyols in each other. In some instances high shear rates have resulted in instability of the emulsions. The emulsions are quite stable at room temperature and slightly above room temperature. However, upon heating above about 100° F. the emulsions may break and do not generally re-form. The particular temperature at which a specific emulsion will break depends upon the components making up the emulsion and the emulsifier and concentration thereof present in the emulsion.

Other emulsifiers have been tried but it was found that they are not as satisfactory. For instance, a 65/35 mixture of two incompatible polyols was prepared and then emulsified. The incompatible polyols mixture contained 65 parts of the propylene oxide adduct of glycerol to a hydroxyl number of about 34 and 35 parts of the propylene oxide adduct of glycerol to a hydroxyl number of about 633. This mixture was emulsified with several different emulsifiers at emulsifier concentrations of 0.5 part per hundred parts and the stability of the emulsions determined.

The emulsion produced according to this invention, which contained 0.5 part of the 80/20 ethylene oxide/propylene oxide block copolymer diol having a molecular weight of about 8,750 as the emulsifier, did not break after standing at room temperature for several months. Such emulsions were also stable after centrifuging for four hours at from 1,500 r.p.m. to 2,000 r.p.m.

Emulsions produced with two other commercially available emulsifiers broke after standing for only 24 hours at room temperature. These emulsifiers were the butanol started block copolymer of ethylene oxide and propylene oxide having an average molecular weight of about 2,500 and the adduct of 40 moles of ethylene oxide to nonylphenol.

Another emulsion produced using the butanol started block copolymer of ethylene oxide and propylene oxide having an average molecular weight of about 3,000 as the emulsifier was stable for 10 days at room temperature and broke after only two hours of centrifuging at 2,000 r.p.m.

The low molecular weight polyols that are used to produce the emulsions of this invention are those polyols that have a hydroxyl number of from about 420 to about 650 or higher. Many such polyols are known and available and include the alkylene oxide adducts of various polyhydric compounds. For example, the mono adducts, the heteric adducts, the block and graft adducts of ethylene oxide, propylene oxide, butylene oxide, etc., with one or more polyhydric starters. Illustrative thereof are the propylene oxide adducts of glycerine having hydroxyl numbers of about 420 or about 633; the propylene oxide adduct of an 80/20 mixture of sorbitol and dipropylene glycol having a hydroxyl number of about 500; the adduct of a mixture of propylene oxide and ethylene oxide with glycerine to a hydroxyl number of about 420 to 633 or higher; the propylene oxide adduct of sucrose having a hydroxyl number of about 450; the adduct of a mixture of propylene oxide and butylene oxide with ethylene glycol to a hydroxyl number of about 450 or higher; the ethylene oxide adduct of glycerine to a hydroxyl number of about 628; the adduct of about six moles of ethylene oxide and one mole of sucrose, the adduct of about 3 to 6 moles of propylene oxide with one mole of trimethylolpropane; the adducts of about 3 moles of ethylene oxide or propylene oxide with one mole of 1,2,6-hexanetriol; and the like. Additional polyhydric compounds that can be used as starters in the reaction with alkylene oxides include pentaerythritol, castor oil, sorbitol, sucrose, alphamethyl glucoside, diethylene glycol, dipropylene glycol, butanediol, pentanediol, hexanediol, triphenylolpropane (phenol formaldehyde condensation products), and the like. Many more are known in the art and are obvious to the average skilled scientist in this field. The critical feature of the low molecular weight polyols is that the hydroxyl number be as previously defined, at least about 420.

The high molecular weight polyols have hydroxyl numbers of from about 56 to about 34, or lower. Many such polyols are known and available and include the alkylene oxide adducts of various polyhydric compounds. The polyols include the adducts of the alkylene oxides containing from 2 to about 4 or more carbon atoms with one or more polyhydric starters as defined above. These adducts can be the mono adducts, i.e. produced with a single alkylene oxide, or the heteric, block or graft adducts; all of these are known in the art, as are the methods for their production. Illustrative high molecular weight polyols include the propylene oxide adducts of glycerine having hydroxyl numbers of 28, 34, 42 and 56; the propylene oxide adducts of 1,2,6-hexanetriol having hydroxyl numbers of 28, 34, 42 and 56; the propylene oxide adducts of dipropylene glycol having hydroxyl numbers of 28 and 37; the heteric mixed oxide adducts of a mixture of propylene oxide and ethylene oxide with glycerine to a hydroxyl number of about 45; the capped polyols of the adduct of propylene oxide with glycerine capped by ethylene oxide having a hydroxyl number of about 56 or lower; the ethylene oxide adducts of glycerine to hydroxyl numbers of about 56 to 28 and lower; and the like. The high molecular weight polyols are known in the art; the critical feature for the purpose of this invention is that they have the previously defined hydroxyl numbers, below about 56.

The selection of the two different polyols is made to give a mixture is not compatible; i.e. a mixture which will separate into two distinct layers or which will form an emulsion or dispersion. The proportions of high molecular weight polyol to low molecular weight polyol can vary from about 90:10 to about 25:75, preferably from about 70:30 to about 45:55; the ratio will depend to some extent upon the components themselves. It is generally preferred to have a major amount of the high molecular weight polyol in the incompatible mixture, i.e. a ratio of greater than 50:50.

The ratio of the hydroxyl number of the low molecular weight polyol to the hydroxyl number of the high molecular weight polyol should be above 10:1, preferably above about 12:1, and most preferably about 15:1 or higher.

The emulsions of the instant invention are believed to produce incompatible urethane polymers mixtures on reaction with isocyanates rather than a homogeneous urethane polymer. The preferred emulsions are those which produce urethane polymers that have both a high temperature glass transition and a low temperature glass transition; i.e. a high temperature glass transition of at least above about 60° C. and a low temperature glass transition of at least below about −30° C. While urethane polymers can be produced from emulsions of incompatible polyols mixtures that have low temperature glass transitions above −30° C. and high temperature glass transitions below 60° C., they are not as desirable; however they can be used when ultimate properties are not required. With the emulsions of the preferred incompatible polyols mixtures the urethane foams produced show little change in stiffness within the temperature range encountered in common usage and one is not plagued with the problem of the consumer observing a great change in the stiffness of the urethane polymer at different seasons of the year. The temperature range encountered in common usage varies, of course, upon the climatic conditions prevalent in a particular geographic area.

The urethane polymers produced with the emulsions of the instant invention can be elastomers or foams. The production of each type is well known in the art, the major difference being that any one of the known foaming agents, or blowing agents, is present in the reaction mixture when a foam is desired. Among the known blowing agents are water, the halocarbons such as the fluorocarbons, low boiling saturated and unsaturated hydrocarbons, and the like. Surprisingly, it has been found that flexible and semi-flexible urethane foams can be produced with the incompatible polyols mixtures without the use of water in the formulation. This was completely unexpected since heretofore flexible and semi-flexible foams could only be obtained when water was present as the blowing agent or in combination with other known blowing agents. The polymers can be produced by the one-shot process, the prepolymer process, or the quasi-prepolymer process.

The organic polyisocyanates that can be used include among others, 2,4- and 2,6-tolylene diisocyanates, phenylene diisocyanates, durylene diisocyanate, bis(4-isocyanatophenyl)-methane, hexamethylene diisocyanate, xylylene diisocyanates, 3,10 - diisocyanatotricyclo$[5,2,1,0^{2,6}]$ decane, and polyisocyanates listed in the publication of Siefken, Annalen 562, pages 122–135 (1949). Other polyisocyanates of particular interest are those obtained by reacting aromatic amines with formaldehyde and phosgenation of the resulting condensation products as described in U.S. Patent Nos. 2,683,730 and 3,012,008. The preferred organic polyisocyanates are the aromatic diisocyanates, and more preferred, the tolylene diisocyanates.

Catalysts can be present to accelerate the reaction. Among those most frequently employed in this art are the amine catalysts and the organo methallic compounds. For example, trimethylamine, N-methylmorpholine, N,N,N',N'-tetramethyl-1,3 - butanediamine, 1,4-diazabicyclo[2.2.1]octane, dibutyltin dilaurate, stannous octoate, dioctyltin diacetate, lead octoate, lead naphthenate, lead oleate, etc. Also useful are other known catalysts such as the tertiary phosphines, the alkali and alkaline earth metal hydroxides or alkoxides, the acidic metal salts of strong acids, salts of various metals, etc. These catalysts are well known in the art and are employed in catalytic quantities, for example, from 0.001 percent to about 5 percent, based on the weight of the reaction mixture.

In addition to the emulsifiers used to produce the emulsions of the incompatible polyols mixture, one can also use a surfactant or foam stabilizer during the production of a urethane foam. These latter surfactants are well known and include the siloxaneoxyalkylene block copolymers described in U.S. Patents 2,834,748 and 2,917,480. In addition the known non-hydrolyzable siloxaneoxyalkylene block copolymers, wherein the polysiloxane moiety is bonded to the polyoxyalkylene moiety through direct carbon-to-silicon bonds rather than through carbon-to-oxygen-to-silicon bonds, can also be used. Many other foam stabilizers, not belonging to the above classes of compounds, are also known and can likewise be used. These foam stabilizers are generally employed at concentrations of from 0.001 to about 5 weight percent of the reaction mixture.

The following examples further serve to illustrate the invention.

EXAMPLE 1

An emulsion was produced using 65 parts of the adduct of glycerine and propylene oxide to a hydroxyl number of 34, 35 parts of the adduct of glycerine and propylene oxide to a hydroxyl number of 633 and a mixture of two emulsifiers each in an amount of 0.25 part. The emulsifiers were the 50/50 ethylene oxide/propylene oxide block copolymer diol having a molecular weight of about 4,500 and the 80/20 ethylene oxide/propylene oxide block copolymer diol having a molecular weight of about 12,250; the propyleneoxy block made up the middle section of the copolymer diol. The emulsion was produced by heating the mixture of glycerine adducts to 50° C. and mixing at 1000 r.p.m. The mixture of molten emulsifiers was added thereto and agitation was continued for another four minutes. The resulting emulsion produces urethane foam by the conventional one-shot process.

EXAMPLE 2

A series of stable emulsions was prepared as described in Example 1 except that the temperature was kept at about room temperature. The total concentration of emulsifiers used was 0.5 parts per hundred parts of emulsion. The emulsifiers used are set forth below; in all instances the emulsifiers were ethylene oxide/propylene oxide block copolymer diols of the oxide ratios and average molecular weights shown.

| Run | EO/PO ratio | M.W. |
| --- | --- | --- |
| 1 | 80/20 | 4,750 |
| 2 | 80/20 | 8,750 |
| 3 | 80/20 | 11,250 |
| 4 | 70/30 | 6,830 |
| 5 | 40/60 | 4,375 |
|   | 80/20 | 8,750 |
|   | 50/50 | 3,500 |
| 6 | 80/20 | 8,750 |
|   | 70/30 | 6,830 |
| 7 | 50/50 | 4,100 |
|   | 70/30 | 6,830 |
| 8 | 50/50 | 4,500 |
|   | 80/20 | 11,250 |

In Runs 5 to 8, the mixtures contained equal amounts of each emulsifier. All the polyol emulsions produce urethane foam by the conventional procedures.

EXAMPLE 3

A stable emulsion was produced from 1,625 parts of the glycerol-propylene oxide adduct having a hydroxyl number of 34 and 875 parts of the glycerol-propylene oxide adduct having a hydroxyl number of 633 using 12.5 parts of the 80/20 ethylene oxide/propylene oxide block copolymer diol having an average molecular weight of about 8,750. The emulsion was produced by stirring for five minutes at 1,000 r.p.m. The emulsion had a Brookfield viscosity of 3,550 c.p.s. A second batch was produced in a similar manner and had a viscosity of about 3,650 c.p.s. Both batches were stable after centrifuging at 2,000 r.p.m. for one hour and after undergoing a freeze/thaw cycle for 24 hours.

A recipe was prepared as outlined below and urethane foam was produced. The foam was produced in the conventional one-shot process by mixing all the ingredients, adding the tolylene diisocyanate, and allowing the reaction to go to completion.

|   | Parts |
| --- | --- |
| Polyol emulsion | 100 |
| Triethylenediamine | 0.1 |
| Water | 1.0 |
| Siloxane-oxyalkylene block copolymer | 1.0 |
| Stannous octoate | 0.2 |
| Tolylene diisocyanate | 50.0 |

The urethane polymers produced with the incompatible polyols emulsions showed two glass transitions.

What is claimed is:

1. An emulsion of (a) an incompatible polyols mixture of a low molecular weight polyol having a hydroxyl number of from about 420 to about 650 and a high molecular weight polyol having a hydroxyl number of from about 34 to about 56; said polyols being present in a weight ratio of high molecular weight to low molecular weight of from about 90:10 to about 25:75 and said polyols having a ratio of the hydroxyl number of the low molecular weight polyol to the hydroxyl number of the high molecular weight polyol of at least 10:1 and (b) from about 0.25 to about 5 weight percent, based on the total weight of the emulsion, of an emulsifier, said emulsifier being an ethylene oxide/propylene oxide block copolymer having an average molecular weight of from about 4,000 to about 25,000 and an ethyleneoxy content of from about 30 to about 90 weight percent.

2. An emulsion as claimed in claim 1, wherein the emulsifier is present at a concentration of from about 0.5 to about 2 weight percent.

3. An emulsion as claimed in claim 2, wherein the emulsifier has an average molecular weight of from about 6,000 to about 15,000 and an ethyleneoxy content of from about 50 to about 80 weight percent.

4. An emulsion as claimed in claim 3, wherein the ratio of the hydroxyl number of the low molecular weight polyol to the hydroxyl number of the high molecular weight polyol is at least 15:1.

5. An emulsion as claimed in claim 4, wherein the ratio of high molecular weight polyol to low molecular weight polyol in the emulsion is from about 70:30 to about 45:55.

References Cited

UNITED STATES PATENTS

| 3,213,049 | 10/1965 | Heiss | 260—29.2 |
| 3,281,397 | 10/1966 | Axelrod | 260—29.2 |
| 3,288,732 | 11/1966 | Chapman et al. | |
| 3,412,047 | 11/1968 | Shriver. | |

MURRAY TILLMAN, Primary Examiner

J. C. BLEUTGE, Assistant Examiner

U.S. Cl. X.R.

260—2.5, 29.2, 29.3, 77.5, 823, 824, 826, 838, 858